(12) United States Patent
Tanihara et al.

(10) Patent No.: US 6,395,066 B1
(45) Date of Patent: May 28, 2002

(54) PARTIALLY CARBONIZED ASYMMETRIC HOLLOW FIBER SEPARATION MEMBRANE, PROCESS FOR ITS PRODUCTION, AND GAS SEPARATION METHOD

(75) Inventors: Nozomu Tanihara, Ube; Yoshihiro Kusuki, Ichihara, both of (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 09/511,407

(22) Filed: Feb. 23, 2000

(30) Foreign Application Priority Data

Mar. 5, 1999 (JP) .......................................... 11-057830
Mar. 29, 1999 (JP) .......................................... 11-086179

(51) Int. Cl.⁷ .............................................. B01D 53/22
(52) U.S. Cl. ...................................... 95/47; 96/8; 96/10
(58) Field of Search ................................. 95/45, 47–55; 96/4, 8, 10

(56) References Cited

U.S. PATENT DOCUMENTS

| | | | |
|---|---|---|---|
| 5,015,269 A | * 5/1991 | Garrett et al. ................. | 95/45 |
| 5,141,642 A | 8/1992 | Kusuki et al. ................ | 210/490 |
| 5,288,304 A | 2/1994 | Koros et al. .................... | 95/45 |
| 5,730,779 A | * 3/1998 | Chernyakov et al. ........ | 95/47 X |
| 5,814,127 A | * 9/1998 | Li ................................. | 95/47 |
| 5,843,208 A | * 12/1998 | Anumakonda et al. ......... | 95/47 |
| 5,976,222 A | * 11/1999 | Yang et al. .................. | 95/47 X |

FOREIGN PATENT DOCUMENTS

| | | |
|---|---|---|
| EP | 0 459 623 | 12/1991 |
| JP | 60-150806 | 8/1985 |
| JP | 60-179102 | 9/1985 |
| JP | 61-133106 | 6/1986 |
| JP | 1-221518 | 9/1989 |
| JP | 2-169019 | 6/1990 |
| JP | 2-251232 | 10/1990 |
| JP | 4-11933 | 1/1992 |
| JP | 4-193334 | 7/1992 |
| JP | 5-220360 | 8/1993 |

OTHER PUBLICATIONS

Patent Abstract of Japanese No. 02251232.
Patent Abstract of Japanese No. 61133106.
Patent Abstract of Japanese Application No. 60150806.
Patent Abstract of Japanese No. 05220360.
Patent Abstract of Japanese No. 01221518.
Patent Abstract of Japanese No. 60179102.
European Search Report.

* cited by examiner

*Primary Examiner*—Robert H. Spitzer
(74) *Attorney, Agent, or Firm*—Morgan, Lewis & Bockius LLP (57) ABSTRACT

A partially carbonized asymmetric hollow fiber separation membrane which is a hollow fiber separation membrane having an asymmetric structure obtained by partial carbonization of an aromatic polyimide hollow fiber separation membrane with an asymmetric structure, wherein the thickness of the aromatic polyimide hollow fiber membrane to be partially carbonized is 8–50 μm, the thickness of the hollow fiber separation membrane obtained by the carbonization is 8–45 μm, and the carbon content of the hollow fiber membrane obtained by partial carbonization is at least 1.05 times the carbon content of the aromatic polyimide hollow fiber membrane to be partially carbonized, and no greater than 90 wt %; also, a process for its production and a gas separation method employing it.

9 Claims, 4 Drawing Sheets

PARTIALLY CARBONIZED ASYMMETRIC HOLLOW FIBER SEPARATION MEMBRANE, PROCESS FOR ITS PRODUCTION, AND GAS SEPARATION METHOD

BACKGROUND OF THE INVENTION

1. Field of the Invention

The present invention relates to a hollow fiber separation membrane with an asymmetric structure that is obtained by partial carbonization of a polyimide hollow fiber separation membrane and exhibits a vastly increased gas separation performance. It further relates to a method, for efficient separation of halogen compound gases from gas mixtures, using the separation membrane.

2. Description of Related Art

High-permeability asymmetric gas separation membranes employing several types of polymer materials are known in the prior art and, recently, in Japanese Unexamined Patent Publication No. 60-179102 and Japanese Unexamined Patent Publication No. 1-221518, for example, there have been proposed processes for the production of porous carbon membranes, as gas separation membranes, with excellent chemical resistance wherein the organic polymer membranes are treated at high temperature, as well as carbon membranes (hollow fiber carbon membranes) obtained by those processes.

However, while Japanese Unexamined Patent Publication No. 60-179102 discloses a separation membrane with an asymmetric structure including both a carbonized membrane and a graphitized membrane composed substantially of carbon obtained by prolonged high-temperature heating of a membrane of polyacrylonitrile or the like, the gas permeation rate ratio of the carbon dioxide gas and nitrogen gas of the membrane has been very small. In addition, this publication does not mention a membrane obtained by partial carbonization of a polymer membrane.

Furthermore, Japanese Unexamined Patent Publication No. 1-221518 discloses hollow fiber carbon membrane fibers having numerous micropores of 3–5 Å in the middle portion, with an adsorption of no greater than 0.1 $cm^3/g$ for molecules of 6 Å or greater, and therefore it is completely different from a membrane having an asymmetric structure of which the major part consists of a portion with a porous structure having a pore size of 6 Å or greater.

On the other hand, Japanese Unexamined Patent Publications No. 4-119331 No. 4-193334 and No. 5-220360 each disclose a hollow fiber membrane with an asymmetric structure obtained by partial carbonization of an aromatic polyimide hollow fiber membrane with an asymmetric structure, and a process for its production.

Incidentally, halogen compounds, primarily $SF_6$ (sulfur hexafluoride) gas, Freom™ gas such-as fluorocarbon gas and chlorofluorocarbon gas, carbon tetrachloride and the like, are used as electrical insulating gases for gas-insulated electrical devices such as gas-insulated switchgear, gas circuit breakers, gas-insulated transformers, line air transmission devices, etc. Recently, as a measure against global warming gases that have become an issue on a global scale, it has been attempted to cut down on their usage by employing mixed gases comprising halogen compounds with other electrical insulating gases (carrier gases) as electrical insulating gases in gas-insulating electrical devices.

In gas-utilizing semiconductor processes in the semiconductor industry, there is a trend toward the exclusive use of perfluoro compounds such as $CF_4$, $C_2F_6$, $C_3F_8$, $C_4F_{10}$, $SF_6$ and $NF_3$ for etching, rinsing and the like. These perfluoro compound gases are used in pure form, in a form diluted, for example, with air, nitrogen or another inert gas, or in the form of a mixture with another perfluoro compound gas or another carrier gas (for example, an inert gas).

Virtually all of these perfluoro compound gases contained in carrier gases are gases with an adverse effect on the environment, including global warming, and consequently they must be recovered and reutilized without being emitted into the atmosphere.

In Japanese Patent Application No. 10-365598, the present inventors have proposed a hollow fiber separation membrane having an asymmetric structure obtained by partial carbonization of an aromatic polyimide hollow fiber separation membrane with an asymmetric structure, for separation and recovery of these perfluoro compound gases, and have demonstrated that the perfluoro compound gases can thereby be efficiently separated and recovered.

However, since a higher efficiency of gas separation and recovery is preferred, and gas purity must be further increased for the reutilization of recovered gases, there is a demand for separation membranes with even higher separation performances.

BRIEF SUMMARY OF THE INVENTION

It is an object of the present invention to provide a hollow fiber separation membrane with a very high permeation rate and high selectivity both for surpassing the conventional hollow fiber separation membranes with asymmetric structures obtained by partial carbonization of aromatic polyimide hollow fiber separation membranes with asymmetric structures. It is a further object to provide a process whereby halogen compounds can be separated and recovered from mixtures of halogen compounds and carrier gases (nitrogen, etc.) containing the aforementioned perfluoro compounds, at a much higher efficiency than by conventional processes.

These objects of the invention are attained by the present invention which has the following construction.

Specifically, the present invention provides a partially, carbonized asymmetric hollow fiber separation membrane which is a hollow fiber separation membrane having an asymmetric structure obtained by partial carbonization of an aromatic polyimide hollow fiber separation membrane with an asymmetric structure (precursor membrane), wherein (1) the thickness of the aromatic polyimide hollow fiber membrane to be partially carbonized (precursor membrane) is 8–50 μm, (2) the thickness of the hollow fiber separation membrane obtained by partial carbonization is 8–45 μm, (3) the carbon content (wt %) of the hollow fiber separation membrane obtained by partial carbonization is at least 1.05 times the carbon content of the aromatic polyimide hollow fiber membrane to be partially carbonized (precursor membrane), and no greater than 90 wt %.

The present invention further provides a production process for a partially carbonized asymmetric hollow fiber separation membrane which is a process whereby an aromatic polyimide hollow fiber separation membrane with an asymmetric structure (precursor membrane) is partially carbonized to produce a partially carbonized hollow fiber separation membrane with an asymmetric structure, wherein (1) the thickness of the aromatic polyimide hollow fiber membrane to be partially carbonized (precursor membrane) is 8–50 μm, (2) the thickness of the hollow fiber separation membrane obtained by partial carbonization is 8–45 μm, (3) the carbon content (wt %) of the hollow fiber separation membrane obtained by partial carbonization is at least 1.05 times the carbon content of the aromatic polyimide hollow fiber membrane to be partially carbonized (precursor membrane), and no greater than 90 wt %.

The present invention still further provides a method of separating halogen compound gases that comprises supplying a mixed gas containing at least one type of halogen compound gas and at least one type of carrier gas to the aforementioned partially carbonized asymmetric hollow fiber separation membrane, withdrawing gas comprising at least one type of carrier gas having a reduced halogen compound content from the permeating side of the membrane, and recovering gas with a greater concentration of at least one type of halogen compound from the non-permeating side of the membrane.

DETAILED DESCRIPTION OF THE INVENTION

The present invention will now be explained in greater detail. The separation membrane of the invention is a hollow fiber separation membrane having an asymmetric structure obtained by partial carbonization of an aromatic polyimide hollow fiber separation membrane with an asymmetric structure (precursor membrane), wherein the thickness of the aromatic polyimide hollow fiber membrane to be partially carbonized (precursor membrane) is 8–50 μm, and preferably 20–50 μm, the thickness of the hollow fiber separation membrane obtained by the carbonization is 8–45 μm, and preferably 14–45 μm, and the carbon content (wt %) thereof is at least 1.05 times, and preferably at least 1.1 times the carbon content of the aromatic polyimide hollow fiber membrane to be partially carbonized (precursor membrane), and no greater than 90 wt %. Here, the carbon content is the weight percentage of carbon present in the hollow fiber membrane based on the weight of the entire hollow fiber membrane.

The partially carbonized hollow fiber separation membrane with an asymmetric structure according to the invention is a membrane with an asymmetric structure composed of a dense layer (homogeneous layer) and a porous layer, wherein at least one of the surface layers is an ultrathin dense layer (homogeneous layer) with a thickness of about 0.001–2 μm and preferably 0.005–0.5 μm, while the remaining layer that includes the inner layer portion of the membrane is a porous layer containing numerous pores with a size of about 0.005–0.5 μm, the membrane forming a hollow fiber with a hollow section running through the center.

The hollow fiber separation membrane with an asymmetric structure obtained by partial carbonization of an aromatic polyimide separation membrane according to the invention has very excellent heat resistance and solvent resistance, while also exhibiting a very high level of improvement in gas separation performance when separating halogen compound gases from mixed gases of halogen compound gases and carrier gases such as nitrogen.

"Partial carbonization" means increasing the proportion of carbon components (carbon content) among the separation membrane components by heat treatment of the hollow fiber separation membrane with an asymmetric structure in an inert gas atmosphere.

The carbonization in the invention is partial carbonization whereby the carbon content (wt %) of the hollow fiber separation membrane obtained by carbonization is at least 1.05 times that of the aromatic polyimide hollow fiber membrane to be carbonized (precursor membrane), and no greater than 90 wt %, while this content is preferably at least 1.1 times and no greater than 90 wt %. Even with partial carbonization, if the carbon content of the resulting hollow fiber separation membrane is less than 1.05 times that of the aromatic polyimide hollow fiber membrane to be partially carbonized (precursor membrane), the gas separation performance of the resulting hollow fiber separation membrane will not be improved. Likewise, if the degree of partial carbonization is increased so that the carbon content of the separation membrane exceeds 90 wt %, the gas separation performance of the resulting hollow fiber separation membrane will also not be improved. With still further carbonization to give a hollow fiber separation membrane composed substantially of carbon (or, a hollow fiber carbon membrane), the gas separation performance will be lowered to a degree rendering it unusable in practice.

In other words, a partially carbonized hollow fiber separation membrane of the invention obtained by partial carbonization of an aromatic polyimide hollow fiber membrane (precursor membrane) with a carbon content of 54.4 wt %, for example, will have a carbon content of 57.1 wt % to 90.0 wt %. Also, a partially carbonized hollow fiber separation membrane of the invention obtained by partial carbonization of an aromatic polyimide hollow fiber membrane (precursor membrane) with a carbon content of 67.9 wt %, for example, will have a carbon content of 71.3 wt % to 90.0 wt %.

The aromatic polyimide hollow fiber membrane with an asymmetric structure prior to partial carbonization (precursor membrane) is a thin membrane with a thickness of 8–50 μm. Hollow fiber membranes with such a small thickness have low membrane stress during the heat treatment for partial carbonization, and are therefore resistant to defects in the separating active layer of the hollow fiber separation membrane. Consequently, it is possible to obtain a hollow fiber separation membrane with very high separation performance. If the membrane thickness exceeds 50 μm, the difference in shrinkage between the interior and exterior of the separation membrane during the heat treatment for partial carbonization will tend to result in defects in the separating layer near the surface of the hollow fiber separation membrane. If the membrane is too thin, the mechanical strength will be reduced rendering it more prone to breakage and therefore impractical. For these reasons, the membrane thickness is at least 8 μm, and preferably at least 20 μm.

The thickness of the hollow fiber separation membrane with an asymmetric structure obtained by partial carbonization is 8–45 μm, and preferably 14–45 μm. If the membrane thickness is smaller than 8 μm the mechanical strength will be reduced, rendering it prone to breakage and therefore impractical. If the membrane thickness is larger than 45 μm, defects will tend to be produced in the separating layer of the membrane surface, thus lowering the degree of separation.

According to the invention, the shrinkage factor of the thickness of the hollow fiber separation membrane due to partial carbonization is preferably 0.1–30%,,and the shrinkage factor of the thickness of the hollow fiber separation membrane due to partial carbonization is more preferably 0.1–25%. The shrinkage factor of the thickness of the hollow fiber separation membrane due to partial carbonization is represented by the difference between the thickness of the aromatic polyimide hollow fiber membrane to be partially carbonized (precursor membrane) and the thickness of the partially carbonized hollow fiber-separation membrane, as a percentage with respect to the thickness of the aromatic polyimide hollow fiber membrane to be partially carbonized (precursor membrane). If the shrinkage factor exceeds 30%, the stress exerted on the hollow fiber membrane during carbonization increases, rendering the resulting hollow fiber carbon membrane more prone to defects in its separating active layer, such that a high level of separation performance may not be attained.

As suitable aromatic polyimide hollow fiber separation membranes with an asymmetric structure (precursor membranes) according to the invention, there may be mentioned asymmetric hollow fiber separation membranes with a simple structure (a simple asymmetric structure that consists of a dense layer on the surface and a porous layer in the interior) that are produced by methods such as described in Japanese Unexamined Patent Publication No. 60-150806, Japanese Unexamined Patent Publication No. 61-133106 and elsewhere, and asymmetric hollow fiber separation membranes with a two-layer extruded structure (a two-layer extruded asymmetric structure wherein the outer layer consists Of a dense layer on the surface and a porous layer in the interior, while the inner layer consists of a porous layer) that are produced by methods such as described in Japanese Unexamined Patent Publication No. 2-169019, Japanese Unexamined Patent Publication No. 2-251232 and elsewhere.

The production process for this asymmetric hollow fiber membrane with a simple membrane structure may be, for example, a process whereby an aromatic tetracarboxylic acid component such as biphenyltetracarboxylic dianhydride and an aromatic diamine component such as diaminodimethyldiphenylenesulfone, diaminodiphenylmethane or 4,4'-diaminodiphenylether are polymerized and imidated in approximately equimolar amounts in a phenolic solvent such as para-chlorophenol to prepare a soluble aromatic polyimide solution, the solution is used as a membrane-forming dope solution for extrusion from a tube-in-orifice type spinning nozzle into a hollow filamentary fiber shape in a nitrogen atmosphere, this is then solidified in a solidifying solution comprising an aqueous ethanol solution to form a hollow fiber membrane with an asymmetric structure, and finally the hollow fiber membrane is washed with ethanol to extract and remove the phenolic solvent, the ethanol is exchanged with an isooctane solvent, and the membrane is then dried and further heat treated to produce a hollow fiber separation membrane with an asymmetric structure, having an appropriate gas permeation rate and selective permeability.

The production process for an asymmetric hollow fiber separation membrane with a two-layer extruded asymmetric structure may be a process wherein two different soluble aromatic polyimides are prepared in the same manner as for production of the aforementioned simple-structure hollow fiber separation membrane, and those solutions are used with a two-layer extrusion spinning nozzle capable of accomplishing two-layer extrusion, or a process whereby a hollow fiber membrane with a two-layer extruded asymmetric structure is produced in almost the same manner as for production of the aforementioned simple-structure hollow fiber membrane.

One of the features of the invention is that a hollow fiber separation membrane with few defects in the separation layer can be obtained by partial carbonization of a hollow fiber separation membrane with a small thickness. Specifically, since the thickness of the aromatic polyimide hollow fiber separation membrane with an asymmetric structure (precursor membrane) is 8–50 μm, and the partial carbonization is accomplished in such a manner that the degree of partial carbonization (a carbon content) is in a suitable range, and more preferably the shrinkage factor of the membrane thickness accompanying the partial carbonization is in a suitable range, in order to obtain a partially carbonized asymmetric hollow fiber separation membrane with vastly improved separation performance, there are no particular restrictions on the process for partial carbonization and any process may be employed provided that it satisfies the conditions given above.

The partial carbonization of the invention is accomplished, for example, as follows. That is, after first preparing an aromatic polyimide hollow fiber separation membrane with an asymmetric structure (precursor membrane) having a prescribed thickness and produced in the manner described above, the hollow fiber separation membrane is subjected to preheating treatment at a temperature in the range of 250–495° C., and preferably 260–450° C., which is also a temperature that can maintain the asymmetric structure of the hollow fiber separation membrane, in an oxygen gas-containing atmosphere for0.1–100 hours, and especially 0.3–50 hours, to achieve heat stabilization, and then the preheat treated hollow fiber membrane is partially carbonized by heat treatment in a temperature range of 500–900° C., and preferably 550–800° C., in an atmosphere of an inert gas such as nitrogen gas, helium gas or argon gas, within a suitable range for the degree of partial carbonization (for the prescribed ranges of the carbon content and shrinkage factor). The heat treatment time in the inert gas atmosphere is not particularly restricted so long as it results in a suitable range for the degree of carbonization (for the prescribed ranges of the carbon content and shrinkage factor), but in most cases it will be an hour or less, and from the standpoint of processing efficiency it is preferably 0.1 minute to 30 minutes and more preferably 0.1 minute to 15 minutes.

In order to maintain the asymmetric structure of the aromatic polyimide hollow fiber separation membrane with an asymmetric structure (precursor membrane) in the subsequent carbonization treatment step, the preheating treatment in the oxygen-containing gas(heat stabilization treatment) is carried out by partial crosslinking and/or partial ring formation of the aromatic polyimide forming the hollow fiber membrane, or by infusibilization or insolubilization, at a temperature in the range of 250–495° C., which is also a temperature that can maintain the asymmetric structure of the hollow fiber membrane, to make a thermally stable aromatic polyimide.

The temperature that can maintain the asymmetric structure of the aromatic polyimide hollow fiber separation membrane with an asymmetric structure (precursor membrane) is, for example, a temperature that is at least 5° C. lower, and preferably at least 10° C. lower, than the softening temperature of the polyimide where the polyimide has a softening temperature as measured by thermal mechanical analysis (TMA); in cases where the polyimide substantially has no softening temperature or secondary transition temperature, it may be a temperature at which the asymmetric structure of the polyimide hollow fiber membrane undergoes no major deformation as observed by an electron microscope or the like, and also a temperature at which the mean pore size of the porous layer undergoes no major reduction (no more than 50%).

The preheating treatment that is within the temperature range specified above may be, for example, preheating treatment with gradual temperature elevation from a temperature near 200° C. up to a high temperature near 450° C., or preheating treatment in multiple stages, with heating at a temperature of 200–350° C. for 0.5–100 hours, and preferably 1–50 hours, followed by heating at a temperature of 350–490° C. for 10–300 minutes, and preferably 20–200 minutes.

The preheating treatment of the asymmetric hollow fiber membrane may be carried out continuously by a continuous supply of the aromatic polyimide hollow fiber membrane with an asymmetric structure (precursor membrane) (long hollow filaments) to a heating furnace at a high temperature, or alternatively it may be carried out with a batch heat treatment whereby multiple bundles of asymmetric hollow fiber membranes are formed and the bundles are placed in a heating furnace at the appropriate temperature and allowed to stand in the heating furnace for a given period.

As examples of oxygen-containing gases to be used for the preheating treatment there may be mentioned air or mixed gases comprising oxygen with nitrogen or another inert gas in various mixing proportions (particularly, 5–30% by volume for the oxygen-containing proportion). According to the process described above, if the preheating treatment is not carried out in the oxygen-containing gas, the asymmetric structure of the hollow fiber membrane will be impaired in the subsequent partial carbonization step, while if the preheating treatment is carried out at too high a temperature, the asymmetric structure of the asymmetric aromatic polyimide hollow fiber membrane will not be maintained to the optimum degree so that the asymmetric structure may be impaired and the structure may lead to a notably inferior gas separating performance; this is unsuitable because the final asymmetric hollow fiber separation membrane will exhibit low performance as a gas separation membrane.

The partial carbonization treatment (heat treatment) for the aromatic polyimide hollow fiber membrane with an asymmetric structure, after preheating treatment, may be carried out continuously by continuously supplying the hollow fiber membrane (long hollow filaments) to a heating furnace at high temperature, or alternatively by a batch process whereby multiple bundles of asymmetric hollow fiber membranes are formed and the bundles are placed in a heating furnace at the appropriate temperature and allowed to stand in the heating furnace for a given period, similar to the preheating treatment described above.

In this process, the asymmetric hollow fiber partially carbonized membrane produced in the manner explained above may be further subjected to post-heat treatment at a temperature of 250–450° C., and particularly 300–400° C., in an atmosphere of an oxygen-containing gas, for 0.2–50 hours, and particularly 0.5–10 hours.

A detailed explanation will now be given regarding a method of using a partially carbonized hollow fiber separation membrane with an asymmetric structure according to the invention for separation and recovery of halogen compound gases.

The separation and recovery of halogen compound gases according to the invention is characterized by supplying a mixed gas including at least one type of halogen compound gas and at least one type of carrier gas to the partially carbonized hollow fiber separation membrane with an asymmetric structure, withdrawing gas comprising at least one type of carrier gas having a reduced halogen compound content from the permeating side of the membrane, and recovering gas with a greater concentration of at least one type of perfluoro compound from the non-permeating side of the membrane.

For separation of a gas mixture, the gas mixture may be supplied from the exterior side of the hollow fibers and the permeated gas withdrawn from the interior side (pore side) of the hollow fibers, or alternatively, the gas mixture may be supplied from one interior end of the hollow fibers for flow permeation into the hollow fibers and withdrawn from the other interior end, while the permeated gas is allowed to pass through the exterior side of the hollow fibers; the latter method is preferred because of its efficiency.

The halogen compound gases are preferably selected from the group consisting of perfluoro compound gases such as $CF_4$, $C_2F_6$, $C_3F_8$, $C_4F_{10}$, $SF_6$ and $NF_3$, Freom™ gases such as fluorocarbons and chlorofluorocarbons, and chlorine compound gases such as carbon tetrachloride, and their mixtures. Perfluoro compounds are widely used in the semiconductor industry for washing during semiconductor manufacturing processes. $SF_6$ gas is a colorless, odorless, non-toxic inert gas that exhibits excellent insulating resistance when raised to a high gas pressure, and since it also has a low liquefaction temperature and can be pressurized at low temperature, it is preferred for use as an electrical insulating gas.

As carrier gases there may be mentioned nitrogen gas, carbon dioxide gas, helium gas, argon gas, air, and the like.

Mixtures of $SF_6$ gas with these gases have high insulating resistance and a high permeation rate ratio for the membrane, and are therefore preferred for gas-insulated electrical devices. In particular, since nitrogen gas is non-toxic and readily obtainable, a mixed gas of $SF_6$ and nitrogen gas is particularly preferred for use in gels-insulated electrical devices.

Mixed gases are those containing at least one type of the halogen compound gas mentioned above and at least one type of the carrier gas mentioned above these may be used in a variety of different mixing proportions, depending on the use. According to the invention, there are no particular restrictions on the component composition and concentration of the mixed gas.

The hollow fiber separation membrane with an asymmetric structure obtained by partial carbonization according to the invention may be used as a gas separation and recovering apparatus by, for example, cutting the hollow fibers to an appropriate length and forming a bundle thereof.(for example, from 100 to 100,000) to prepare a hollow fiber membrane bundle, attaching together both ends thereof with a resin such as an epoxy resin such that the hollows at both ends are not plugged, and housing it in a container with at least a gas mixture (crude gas) supply port, a non-permeating gas discharge port and a permeating gas discharge port.

Figure 1:
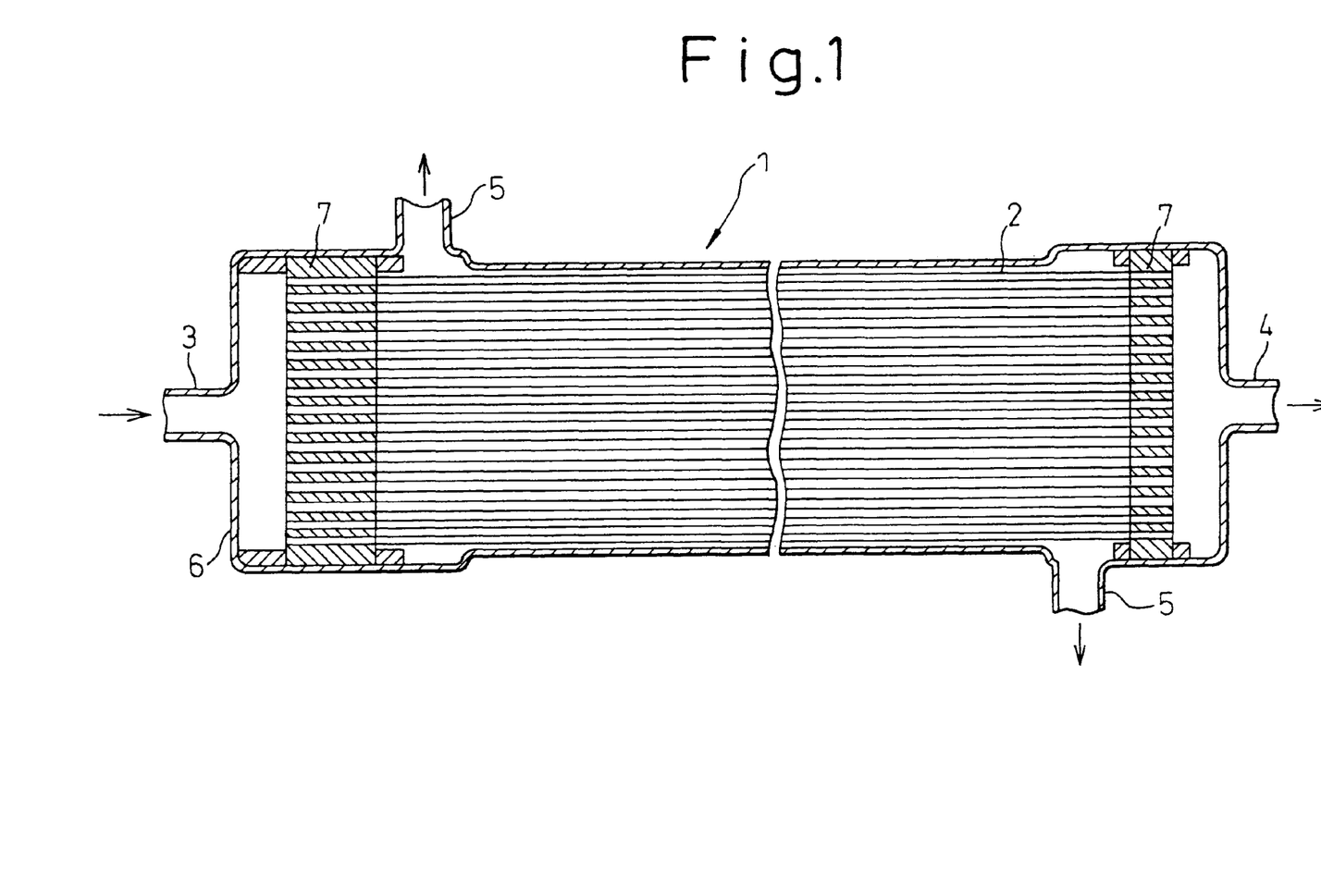
FIG. 1 is a schematic cross-sectional view of an embodiment of an apparatus employing a partially carbonized asymmetric hollow fiber separation membrane for separation and recovery of a halogen compound gas.

FIG. 1 shows an embodiment of a gas separation and recovering apparatus employing a hollow fiber separation membrane with an asymmetric structure obtained by partial carbonization according to the invention, for separation and recovery of halogen compounds. $SF_6$ will be used as the representative halogen compound gas in the following explanation. The gas separation and recovering apparatus 1 comprises as separation membrane in the form of a plurality of hollow fibers 2, housed in a sealed container 6. A mixed gas comprising $SF_6$ and at least one type of carrier gas is continuously supplied through a mixed gas supply port 3 of the gas separating and recovering apparatus 1 by a compressor, blower or the like, and flows in through the interior of the hollow fibers 2 toward the non-permeating gas discharge port 4. The gas (mainly carrier gas) that has selectively permeated the separation membrane during that time is discharged through permeating gas discharge ports 5 while the gas (mainly $SF_6$) that has not permeated the separation membrane is discharged through the non-permeating gas discharge port 4, thus allowing separation and recovery of the $SF_6$ from the non-permeating gas discharge port 4. The resin walls 7 in FIG. 1 are disk-shaped resin walls formed by hardening a suitable thermosetting resin such as an elastomer resin, acrylate resin, epoxy resin or phenolic resin at both ends of the hollow fibers 2, and each of the hollow fibers passes through the resin walls with the hollows in the hollow fibers opening toward the outer sides of the resin walls. The resin walls 7 are sealed and attached to the inner wall of the sealed container 6 using an adhesive or the like. For even higher separation and recovering efficiency, it is effective to connect a vacuum pump or the like to the permeating gas discharge ports 5 of the gas separation apparatus 1 to depressurize the permeating gas for recovery, or another type of gas not contained in the mixers gas may be supplied as a purge gas from one of the permeating gas discharge ports 5, and discharged from the other permeating gas discharge port together with the permeating gas.

In the halogen compound separation and recovery method of the invention, the mixed gas is processed with an adsorption apparatus, filter, scrubber, etc. if necessary prior to being supplied to the gas separation and recovering apparatus. The concentrated halogen compound gas that has been separated and recovered from the gas separation and recovering apparatus may also be subjected to further post-processing using another gas separation membrane apparatus, adsorption apparatus, fractionating apparatus, or the like.

The halogen compound separation and recovery method of the invention may be carried out at normal temperature or under heated conditions. For heating, it is preferably carried out at no higher than 150° C. in consideration of the heat resistance of the gas separation and recovering apparatus.

The present invention will now be explained in greater detail by way of the following reference examples and examples. These examples, however, are in no way intended to restrict the invention. The methods described below were used to measure the gas permeation performance of each gas and carbon content for the different aromatic polyimide hollow fiber membranes (precursor membranes) and hollow fiber separation membranes with an asymmetric structure obtained by partial carbonization.
Gas Permeation Performance First, the hollow fiber membrane produced in each of the examples below, a stainless steel pipe and an epoxy resin-based adhesive were used to fabricate a hollow fiber element for evaluation of the permeation performance. For the permeation performance with pure $N_2$ gas, the hollow fiber element of the hollow fiber membrane to be provided for permeation performance evaluation was mounted on a stainless steel container, a gas permeation test was conducted at a temperature of 50° C. and a supply pressure of 10 kgf/cm²G, and the gas permeation rate was calculated. For the permeation performance with mixed gases of $N_2$ and $SF_6$, $N_2$ and $CF_4$ and $N_2$ and $C_2F_6$, a gas permeation test was conducted at a temperature of 50° C. and a supply pressure of 2 kgf/cm²G, and the gas permeation rate and the permeation rate ratio for each gas (selective permeability, degree of separation) were calculated from the values measured by gas chromatography.
Carbon Content This was measured using an elemental analyzer (Model 240C, product of Perkin Elmer).

REFERENCE EXAMPLE 1

Preparation of Polyimide Solution

After placing 40 millimoles of 3,3',4,4'-biphenyltetracarboxylic dianhydride (BPDA), 45 millimoles of 2,2'-bis(3,4-dicarboxyphenyl)hexafluoropropane dianhydride (6FDA) and 15 millimoles of pyromellitic dianhydride (PMDA) as the acid components for the polyimide starting material and 50 millimoles of dimethyl-3,7-diaminodibenzothiophene-5,5-dioxide (TSN) and 50 millimoles of 2,2',5,5'-tetrachlorobenzidine (TCB) as the diamine components together with 331 g of para-chlorophenol in a separable flask equipped with a stirrer and a nitrogen gas introduction tube, nitrogen gas was admitted and the reaction solution was stirred for 18 hours to polymerize at a polymerization temperature of 180° C., to prepare an aromatic polyimide solution with an aromatic polyimide concentration of 16 wt %. The polyimide solution had a rotational viscosity of 1600 poise at 100° C. The aromatic polyimide solution was filtered with a 400 mesh stainless steel wire mesh to prepare a dope solution for spinning.
Production of Asymmetric Hollow Fiber Membrane The spinning dope solution was charged into a spinning apparatus equipped with a hollow filamentary fiber spinning nozzle (outer diameter of circular aperture: 1000 μm, slit width of circular aperture: 200 μm, outer diameter of core aperture: 400 μm), and nitrogen gas was blown out through the core aperture of the spinning nozzle while the spinning dope solution was blown out through the spinning nozzle into hollow filamentary fibers to allow the hollow fibers to pass through a nitrogen atmosphere, after which they were immersed in a primary coagulation bath (0° C.) comprising an aqueous solution containing 70% ethanol, and then a secondary coagulation bath (0° C.) in a secondary coagulation apparatus provided with a pair of guide rolls was used to complete coagulation of the hollow fibers by reciprocating the hollow fibers between the guide rolls, to effect the spinning of aromatic polyimide hollow fiber membranes while drawing it out with a drawing roll (draw speed: 10 m/min).

Finally, the hollow fiber membranes were wound up on a bobbin and the coagulation solvent, etc. was thoroughly washed out with ethanol, after which the ethanol was exchanged with isooctane (exchange solvent) and the hollow fiber membranes were heated to 100° C. for evaporation of the isooctane and drying, and then the hollow fiber membranes were heat treated for 30 minutes at a temperature of 270° C., to produce dried and heat treated aromatic polyimide asymmetric hollow fiber membranes (hollow fiber membrane outer diameter: 356 μm, membrane thickness: 43 μm).

REFERENCE EXAMPLE 2

The same method as in Reference Example 1 was used to produce an aromatic polyimide asymmetric hollow fiber membrane with a hollow fiber membrane outer diameter of 220 μm and a membrane thickness of 42 μm, by changing the core nitrogen discharge amount and the spinning dope solution discharge amount.

REFERENCE EXAMPLE 3

The same method as in Reference Example 1 was used to produce an aromatic polyimide asymmetric hollow fiber membrane with an outer diameter of 428 μm and a thickness of 75 μm, by changing the core nitrogen discharge amount and the spinning dope solution discharge amount.

REFERENCE EXAMPLE 4

An aromatic polyimide asymmetric hollow fiber membrane with an outer diameter of 275 μm and a thickness of 22 μm was produced by the same method as in Reference Example 1, except that a hollow fiber spinning nozzle (outer diameter of circular aperture: 1000 μm, slit width of circular aperture: 100 μm, outer diameter of core aperture: 400 μm) was used, and the core nitrogen discharge amount and the spinning dope solution discharge amount were changed.

EXAMPLE 1

The asymmetric hollow fiber membrane obtained in Reference Example 1 was heat stabilized by preheating treatment at 400° C. for 30 minutes in an oven with an air atmosphere, under no tension. The preheated asymmetric hollow fiber membrane was then heat treated by being passed through an electrical tubular furnace with a quartz glass tube adjusted to 500° C. and sustained under nitrogen atmosphere with a residence time of 4 minutes, at a contstant speed of 20 cm/min between a feed roll and a take-up roll, to produce a partially carbonized asymmetric hollow fiber separation membrane.

Upon obtaining the partially carbonized asymmetric hollow fiber separation membrane in this manner, an electron microscope was used to take a 10,000× photograph of a fracture plane of the hollow fiber separation membrane, and the photographed cross-section of the hollow fiber separation membrane was observed; this was used to confirm the asymmetric structure comprising the dense layer (surface layer) and porous layer (porous layer adjacent to the dense layer). The gas permeation performance, carbon content and the other parameters were measured according to the methods described above. The results are shown in Table 1.

EXAMPLES 2–5

Partial carbonization treatment was carried out by the same method as in Example 1, except for changing the carbonization temperature to 550° C. (Example 2), 600° C. (Example 3), 650° C. (Example 4) and 700° C. (Example 5), to produce partially carbonized asymmetric hollow fiber separation membranes. Confirmation of the asymmetric structure of the hollow fiber separation membranes and measurement of the gas permeation performance, carbon contents and other parameters were carried out in the same manner as Example 1. The results are shown in Table 1.

EXAMPLE 6

Partial carbonization treatment was carried out by the same method as in Example 1, except for using an asymmetric hollow fiber membrane obtained according to Reference Example 2, to produce a partially carbonized asymmetric hollow fiber separation membrane. Confirmation of the asymmetric structure of the hollow fiber separation membrane and measurement of the gas permeation performance, carbon content and other parameters were carried out in the same manner as Example 1. The results are shown in Table 1.

EXAMPLES 7, 8

Partial carbonization treatment was carried out by the same method as in Example 6, except for changing the partial carbonization temperature to 550° C. (Example 7) and 600° C. (Example 8), to produce partially carbonized asymmetric hollow fiber separation membranes. Confirmation of the asymmetric structure of the hollow fiber separation membranes and measurement of the gas permeation performance, carbon content and other parameters were carried out in the game manner as Example 1. The results are shown in Table 1.

EXAMPLES 9, 10

Partial carbonization treatment was carried out by the same method as in Example 1, except for using asymmetric hollow fiber membranes obtained according to Reference Example 4 and changing the partial carbonization temperature to 550° C. (Example 9) and 600° C. (Example 10), to produce partially carbonized asymmetric hollow fiber separation membranes. Confirmation of the asymmetric structure of the hollow fiber separation membranes and measurement of the gas permeation performance, carbon content and other parameters were carried cut in the same manner as Example 1. The results are shown in Table 1.

Comparative Example 1

Partial carbonization treatment was carried out by the same method as in Example 3, except for using an asymmetric hollow fiber membrane obtained according to Reference Example 3, to produce a partially carbonized asymmetric hollow fiber separation membrane. Confirmation of the asymmetric structure of the hollow fiber separation membrane and measurement of the gas permeation performance, carbon content and other parameters were carried out in the same manner as Example 1. The results are shown in Table 1.

Comparative Example 2

Partial carbonization treatment was carried out by the same method as in Comparative Example 1, except for changing the partial carbonization temperature to 650° C., to produce a partially carbonized asymmetric hollow fiber separation membrane. Confirmation of the asymmetric structure of the hollow fiber separation membrane and measurement of the gas permeation performance, carbon content and other parameters were carried out in the same manner as Example 1. The results are shown in Table 1.

Comparative Example 3

An asymmetric hollow fiber membrane obtained according to Reference Example 1 was subjected to heat treatment (for a low degree of partial carbonization) in the same manner as Example 1, with adjustment to 450° C. after preheating treatment but otherwise under the same conditions. Confirmation of the asymmetric structure of the hollow fiber separation membrane and measurement of the gas permeation performance, carbon content and other parameters were carried out in the same manner as Example 1. The results are shown in Table 1.

Comparative Example 4

An asymmetric hollow fiber membrane obtained according to Reference Example 1 was subjected to heat treatment (for an excessively high degree of partial carbonization) in the same manner as Example 1, with adjustment to 1000° C. after preheating treatment but otherwise under the same conditions. Confirmation of the asymmetric structure of the hollow fiber separation membrane and measurement of the gas permeation performance, carbon content and other parameters were carried out in the same manner as Example 1. The results are shown in Table 1.

Comparative Example 5

An asymmetric hollow fiber membrane obtained according to Reference Example 1 was subjected to heat treatment: (for an excessively high degree of partial carbonization) in the same manner as Example 1, with adjustment to 1200° C. after preheating treatment but otherwise under the same conditions. Confirmation of the asymmetric structure of the hollow fiber separation membrane and measurement of the gas permeation performance, carbon content and other parameters were carried out in the same manner as Example 1. The results are shown in Table 1.

Figure 2:
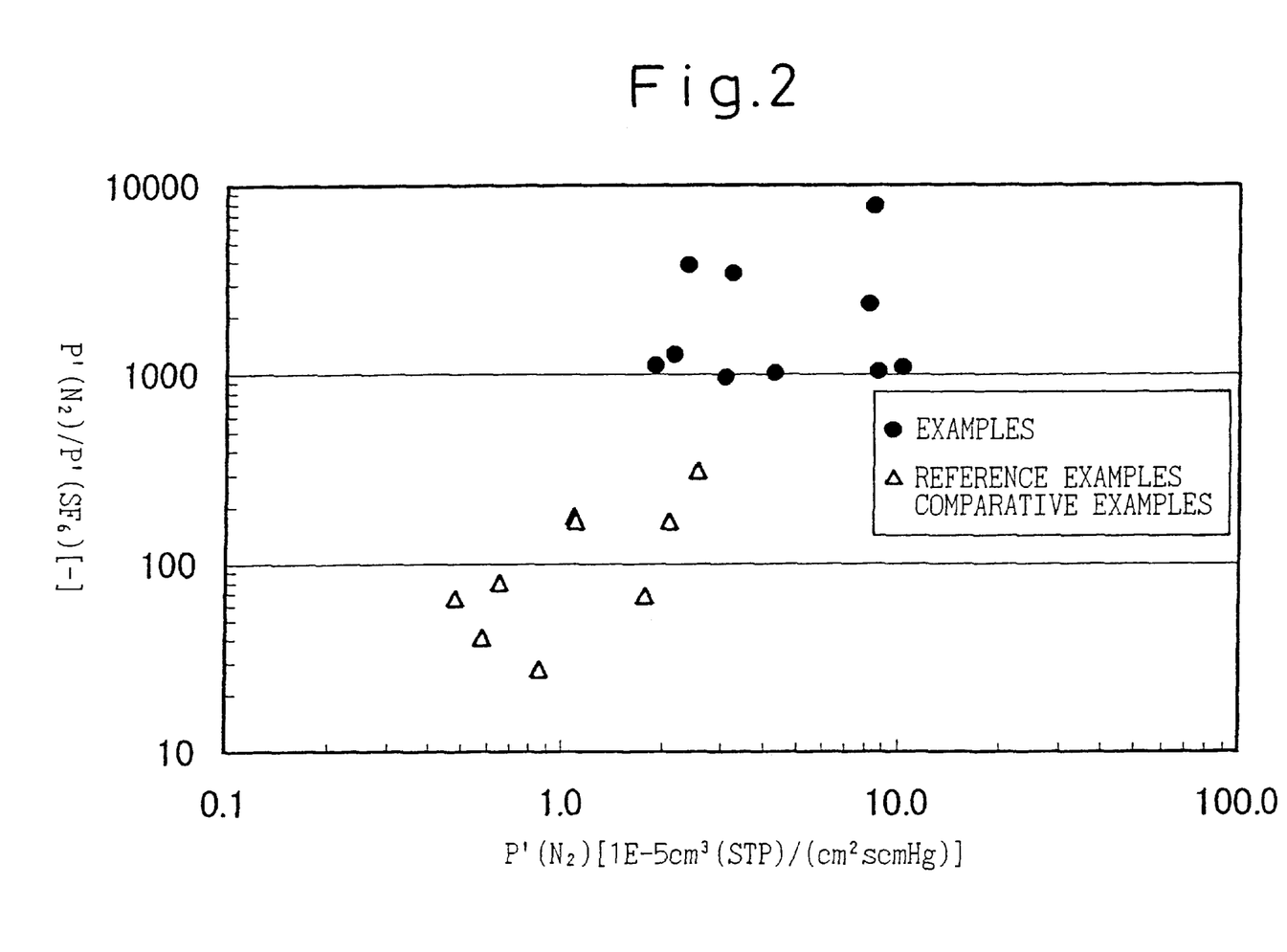
FIG. 2 is a graph showing the relationship between the permeation rate ratio for a $N_2$ and $SF_6$ mixed gas and the permeation rate of $N_2$.
Figure 3:
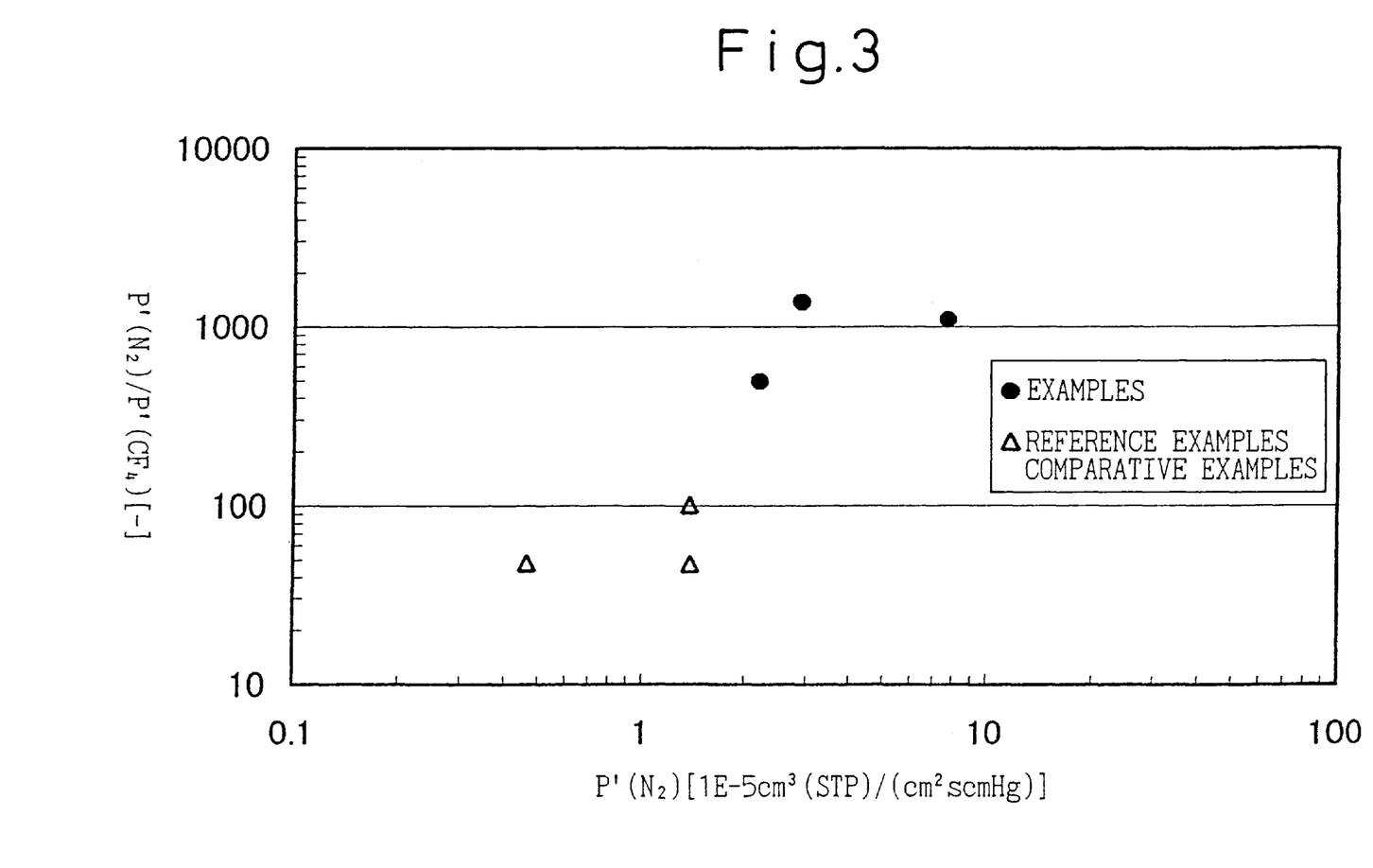
FIG. 3 is a graph showing the relationship between the permeation rate ratio for a $N_2$ and $CF_4$ mixed gas and the permeation rate of $N_2$.
Figure 4:
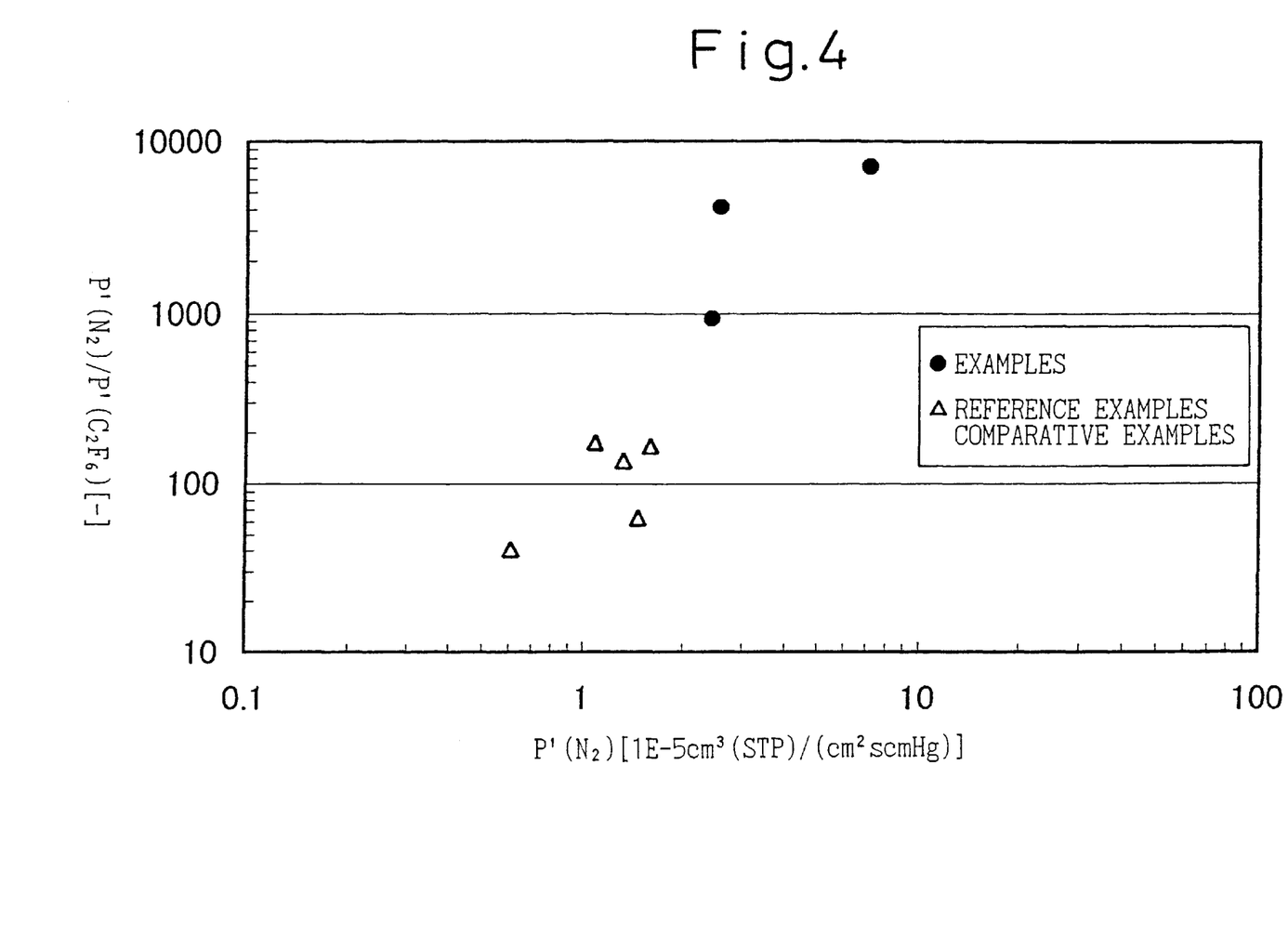
FIG. 4 is a graph showing the relationship between the permeation rate ratio for a $N_2$ and $C_2F_6$ mixed gas and the permeation rate of $N_2$.

The performance of a separation membrane involves a trade-off relationship between the gas permeation rate and the mixed gas permeation rate ratio (degree of separation); separating membranes with large permeation rates tend to have low degrees of separation while separating membranes with high degrees of separation tend to have low permeation rates. The relationships between the permeation rates and permeation rate ratios for the examples, comparative examples and reference example are shown in FIGS. 2–4. As FIGS. 2–4 clearly show, the examples of the invention, which are toward the right upper side, have large permeation rate ratios (degrees of separation) even with high permeation rates, thus indicating that they can accomplish separation of mixed gases much more efficiently than the comparative examples.

Table 1 shows the permeation rate and permeation rate ratio (degree of separation) for each measured gas mixture, as well as the product S of the permeation rate and permeation rate ratio, as one indicator of separation efficiency. As seen in Table 1, the hollow fiber partially carbonized membranes with a thickness of 45 $\mu$m or smaller, that were obtained by partial carbonization of polyimide hollow fiber membranes with a thickness of 50 $\mu$m or smaller, had large nitrogen permeation rates and notably large nitrogen and halogen compound permeation rate ratios, compared to the organic membranes (precursor membranes) or the partially carbonized separation membranes with a large membrane thickness, while a very notable improvement was seen in the product S representing the separation efficiency.

On the other hand, the polyimide hollow fiber membranes with a thickness of less than 8 $\mu$m and the partially carbonized hollow fiber separation membranes with a membrane thickness of less than 8 $\mu$m had low mechanical strength and were unsuitable for practical use.

Table 1 also shows that the notable improvement in separation performance is seen only when the degree of partial carbonization is in the appropriate range, and that such improved separation performance is not exhibited with a low degree of partial carbonization or with an excessively high degree of partial carbonization.

TABLE 1

| | Starting hollow fibers (Ref. Ex. No.) | Carbonization temperature [° C.] | Carbon content [%] | Outer diameter [$\mu$] | Inner diameter [$\mu$] | Thickness [$\mu$] | Shrinkage factor [%] | Pure gas Perm. rate P' (N$_2$) |
|---|---|---|---|---|---|---|---|---|
| Ex. 1 | 1 | 500 | 65.1 | 334 | 260 | 37 | 14 | 2.53 |
| Ex. 2 | 1 | 550 | 69.3 | 322 | 244 | 39 | 9 | 8.26 |
| Ex. 3 | 1 | 600 | 72.5 | 322 | 242 | 40 | 7 | 6.84 |
| Ex. 4 | 1 | 650 | 80.7 | 303 | 234 | 35 | 20 | 3.54 |
| Ex. 5 | 1 | 700 | 85.5 | 312 | 237 | 38 | 13 | 1.76 |
| Ex. 6 | 2 | 500 | 64.9 | 194 | 117 | 39 | 7 | 1.29 |
| Ex. 7 | 2 | 550 | 69.5 | 197 | 125 | 36 | 13 | 7.00 |
| Ex. 8 | 2 | 600 | 72.8 | 189 | 118 | 36 | 14 | 2.06 |
| Ex. 9 | 4 | 550 | 69.8 | 241 | 204 | 19 | 14 | |
| Ex. 10 | 4 | 600 | 72.9 | 229 | 196 | 17 | 23 | |
| Ref. Ex. 1 | 1 | none | 54.4 | 356 | 270 | 43 | — | 0.45 |
| Ref. Ex. 2 | 2 | none | 54.4 | 220 | 137 | 42 | — | 0.43 |
| Ref. Ex. 3 | 3 | none | 54.4 | 428 | 279 | 75 | — | 1.39 |
| Ref. Ex. 4 | 4 | none | 54.4 | 275 | 232 | 22 | — | |
| Comp. Ex. 1 | 3 | 600 | 72.3 | 368 | 245 | 62 | 17 | 2.05 |
| Comp. Ex. 2 | 3 | 650 | 80.1 | 335 | 222 | 57 | 24 | 1.69 |
| Comp. Ex. 3 | 1 | 450 | 55.5 | 349 | 265 | 42 | 2 | 1.50 |
| Comp. Ex. 4 | 1 | 1000 | 91.2 | 298 | 235 | 32 | 25 | 0.91 |
| Comp. Ex. 5 | 1 | 1200 | 93.0 | 318 | 206 | 56 | 25 | 0.52 |

| | Mixed gas (N$_2$/SF$_6$ = 50/50) | | | Mixed gas (N$_2$/C$_2$F$_6$ = 50/50) | | | Mixed gas (N$_2$/CF$_4$ = 50/50) | | |
|---|---|---|---|---|---|---|---|---|---|
| | Perm. rate P' (N$_2$) | P' (N$_2$) / P' (SF$_6$) | S | Perm. rate P' (N$_2$) | P' (N$_2$) / P' (C$_2$F$_6$) | S | Perm. rate P' N$_2$ | P' (N$_2$) / P' (CF$_4$) | S |
| Ex. 1 | 3.09 | 957 | 2957 | | | | | | |
| Ex. 2 | 10.30 | 1090 | 11227 | | | | | | |
| Ex. 3 | 8.26 | 2350 | 19411 | | | | | | |
| Ex. 4 | 4.31 | 1010 | 4353 | | | | | | |

TABLE 1-continued

|  |  |  |  |  |  |  |  |  |  |
|---|---|---|---|---|---|---|---|---|---|
| Ex. 5 | 2.16 | 1260 | 2722 |  |  |  |  |  |  |
| Ex. 6 | 1.89 | 1110 | 2098 | 1.95 | 540 | 1053 |  |  |  |
| Ex. 7 | 8.74 | 1030 | 9002 | 8.52 | 650 | 5538 |  |  |  |
| Ex. 8 | 2.38 | 3770 | 8973 | 2.43 | 920 | 2236 | 2.19 | 490 | 1073 |
| Ex. 9 | 8.54 | 7764 | 66305 | 7.16 | 7089 | 50757 | 7.73 | 1095 | 8464 |
| Ex. 10 | 3.24 | 3403 | 11026 | 2.58 | 4095 | 10565 | 2.89 | 1357 | 3922 |
| Ref. Ex. 1 | 0.58 | 41 | 23 |  |  |  |  |  |  |
| Ref. Ex. 2 | 0.48 | 66 | 32 |  |  |  | 0.47 | 48 | 22 |
| Ref. Ex. 3 | 1.77 | 68 | 120 | 1.46 | 63 | 92 | 1.39 | 47 | 66 |
| Ref. Ex. 4 | 0.86 | 28 | 24 |  |  |  |  |  |  |
| Comp. Ex. 1 | 2.54 | 315 | 800 | 1.32 | 137 | 181 | 1.38 | 101 | 139 |
| Comp. Ex. 2 | 2.09 | 171 | 357 |  |  |  |  |  |  |
| Comp. Ex. 3 | 1.90 | 180 | 342 | 1.6 | 160 | 256 |  |  |  |
| Comp. Ex. 4 | 1.10 | 170 | 187 | 1.1 | 153 | 168 |  |  |  |
| Comp. Ex. 5 | 0.65 | 80 | 52 | 0.61 | 41 | 25 |  |  |  |

P': Permeation rate [$10^{-5}$ cm$^3$ (STP)/(cm$^2$scmHg)]
Measuring conditions: 50° C., pure gas supply pressure: 10 kgf/cm$^2$G, mixed gas supply pressure: 2 kgf/cm$^2$G
S is the total evaluation of membrane performance, and represents the product of the permeation rate and permeation rate ratio.

As explained above, in a hollow fiber separating membrane with an asymmetric structure obtained by partial carbonization of an aromatic polyimide hollow fiber separation membrane with an asymmetric structure (precursor membrane), the hollow fiber membrane prior to partial carbonization (the precursor membrane) is limited to a small thickness so that the thickness of the asymmetric hollow fiber separation membrane obtained by the partial carbonization is 8–45 μm, and the carbon content of the partially carbonized hollow fiber separation membrane is at least 1.05 times the carbon content of the precursor membrane and no greater than 90 wt %, while the shrinkage factor for the membrane thickness is preferably from 0.1 to no greater than 30; it is thus possible to obtain a very useful hollow fiber separation membrane with minimal generation of defects in the separation layer during carbonization, and a high permeation rate and high selectivity surpassing those of the precursor membrane and of conventional partially carbonized asymmetric hollow fiber separation membranes. The membrane can also be used for very efficient separation and recovery of halogen compounds.

What is claimed is:

1. A method of separating halogen compound gases that comprise supplying a mixed gas containing at least one type of halogen compound gas and at least one type of carrier gas to a partially carbonized asymmetric hollow fiber separation membrane having an asymmetric structure obtained by partial carbonization of an aromatic polyimide hollow fiber separation membrane, with an asymmetric structure, wherein
   (1) the thickness of the aromatic polyimide hollow fiber membrane to be partially carbonized is 8–50 μm,
   (2) the thickness of the hollow fiber separation membrane obtained by partial carbonization is 8–45μm,
   (3) the carbon content of the hollow fiber separation membrane obtained by partial carbonization is at least 1.05 time,; the carbon content of the aromatic polyimide hollow fiber membrane to be partially carbonized, and no greater than 90 wt %,
   (4) the gas permeation rate ratio (separation coefficient) for nitrogen gas and SF$_6$ gas at 50° C. is 500 or greater, and
   withdrawing gas comprising at least one type of carrier gas having a reduced halogen compound content from the permeating side of the membrane, and recovering gas with a greater concentration of at least one type of halogen compound from the non-permeating side of the membrane.

2. A method according to claim 1, wherein the shrinkage factor of the thickness of the hollow fiber separation membrane due to partial carbonization is 0.1–30%.

3. A partially carbonized asymmetric hollow fiber separation membrane which is a hollow fiber separation membrane having an asymmetric structure obtained by partial carbonization of an aromatic polyimide hollow fiber separation membrane with an asymmetric structure, wherein
   (1) the thickness of the aromatic polyimide hollow fiber membrane to be partially carbonized is 8–50 μm,
   (2) the thickness of the hollow fiber separation membrane obtained by partial carbonization is 8–45 μm,
   (3) the carbon content of the hollow fiber separation membrane obtained by partial carbonization is at least 1.05 times the carbon content of the aromatic polyimide hollow fiber membrane to be partially carbonized, and no greater than 90 wt %,
   (4) the gas permeation rate ratio (separation coefficient) for nitrogen gas and SF$_6$ gas at 50° C. is 500 or greater.

4. A partially carbonized asymmetric hollow fiber separation membrane according to claim 3, wherein the shrinkage factor of the thickness of the hollow fiber separation membrane due to partial carbonization is 0.1–30%.

5. A production process for a partially carbonized asymmetric hollow fiber separation membrane which is a process whereby an aromatic polyimide hollow fiber separation membrane with an asymmetric structure is partially carbonized to produce a partially carbonized hollow fiber separation membrane with an asymmetric structure, wherein
   (1) the thickness of the aromatic polyimide hollow fiber membrane to be partially carbonized is 8–50 μm,
   (2) the thickness of the hollow fiber separation membrane obtained by partial carbonization is 8–45 μm,
   (3) the carbon content of the hollow fiber separation membrane obtained by partial carbonization is at least 1.05 times the carbon content of the aromatic polyimide hollow fiber membrane to be partially carbonized, and no greater than 90 wt %,
   (4) the gas permeation rate ratio (separation coefficient) for nitrogen gas and SF$_6$ gas at 50° C. is 500 or greater.

6. A process according to claim 5, wherein the shrinkage factor of the thickness of the hollow fiber separation membrane due to partial carbonization is 0.1–30%.

7. A process according to claim 5, wherein the aromatic polyimide hollow fiber membrane to be partially carbonized is subjected to preheating treatment in an oxygen-containing atmosphere while maintaining the asymmetric structure of the hollow fiber membrane, and the preheat treated hollow fiber membrane is subjected to heat treatment in an inert gas atmosphere so that the carbon content of the resulting hollow fiber separation membrane is at least 1.05 times the carbon content of the aromatic polyimide hollow fiber membrane to be partially carbonized, and no greater than 90% by weight.

8. A process according to claim 7, wherein the preheating treatment is carried out at a temperature of 250 to 495° C.

9. A process according to claim 7, wherein the heat treatment is carried out at a temperature of 500 to 900° C.

* * * * *